May 6, 1969      L. W. COZAD      3,442,423
APPARATUS FOR DISPENSING PRECUT POTATOES AND LIKE MATERIAL
Filed Jan. 9, 1967      Sheet 1 of 2
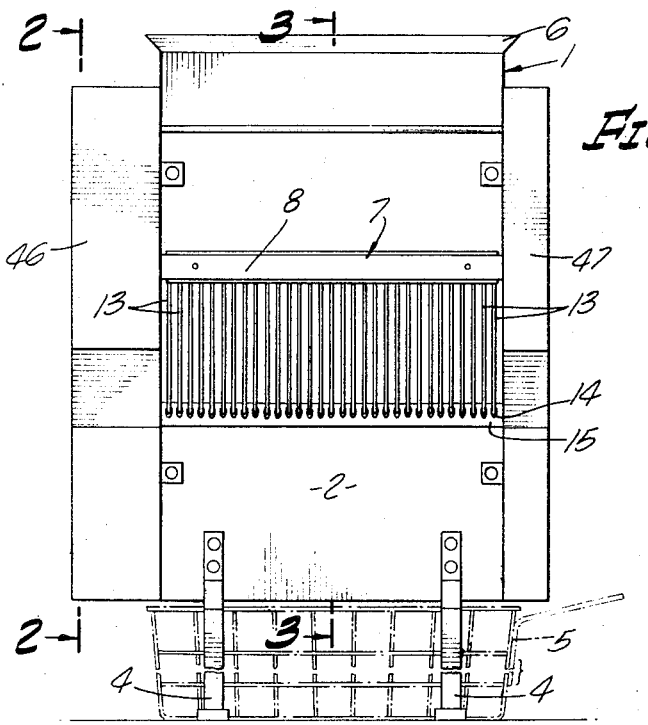
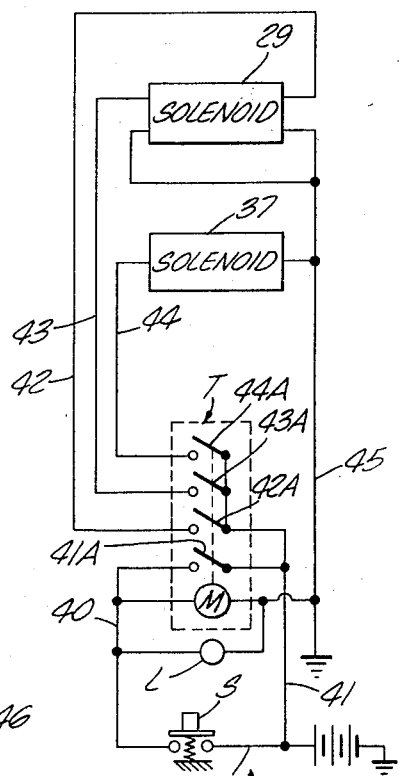
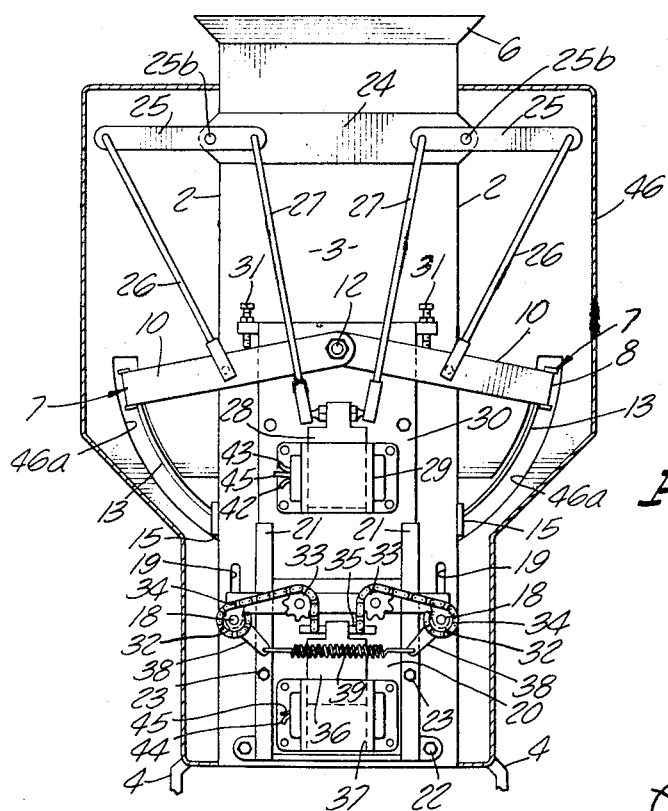
LESTER W. COZAD
INVENTOR.
BY Paul A. Weilein
ATTORNEY May 6, 1969 L. W. COZAD 3,442,423
APPARATUS FOR DISPENSING PRECUT POTATOES AND LIKE MATERIAL
Filed Jan. 9, 1967 Sheet 2 of 2
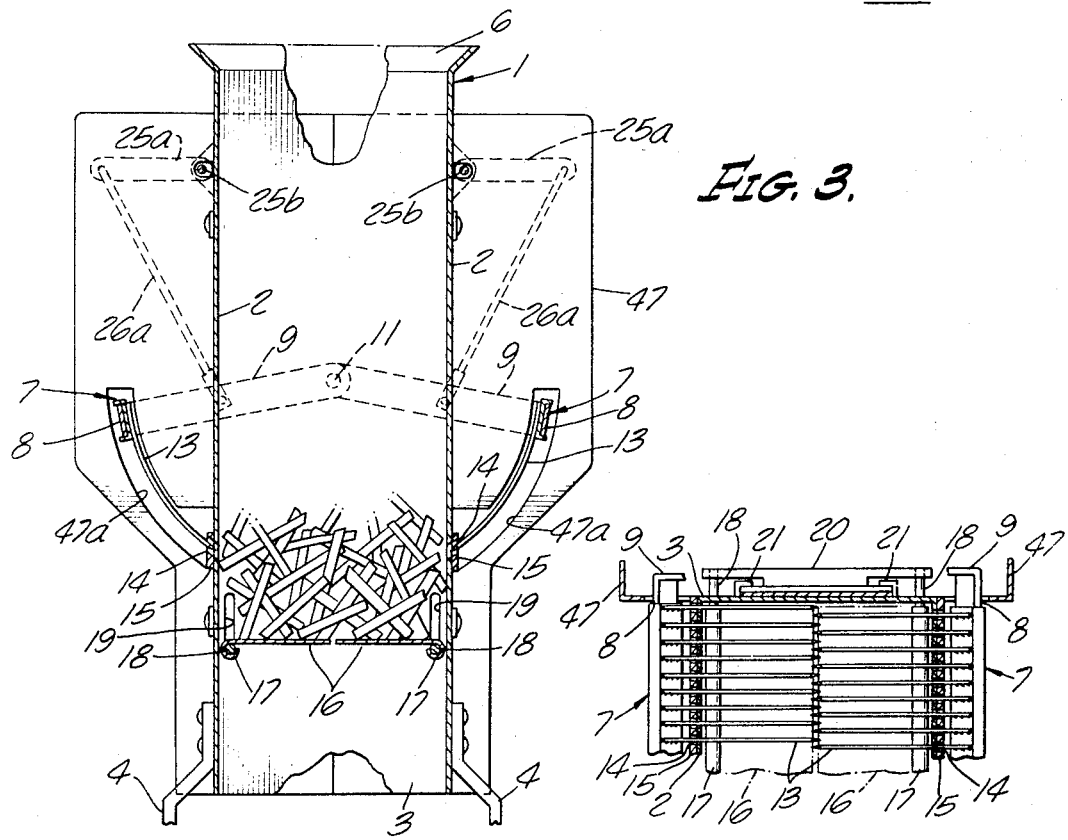
FIG. 3.
FIG. 5.
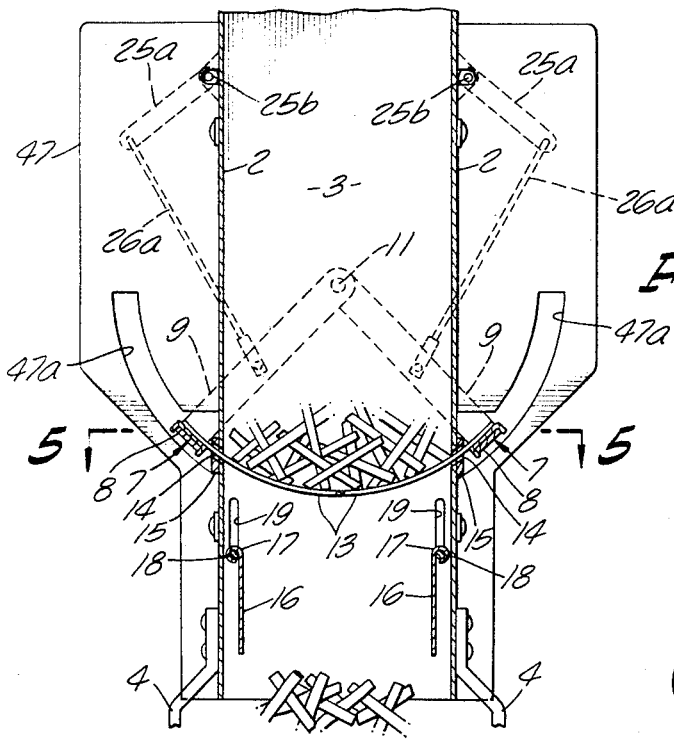
FIG. 4.
LESTER W. COZAD
INVENTOR.
BY Paul A. Weilein
ATTORNEY

# United States Patent Office 3,442,423
Patented May 6, 1969

3,442,423
APPARATUS FOR DISPENSING PRECUT
POTATOES AND LIKE MATERIAL
Lester W. Cozad, 333 Mariposa Drive,
Ventura, Calif. 93001
Filed Jan. 9, 1967, Ser. No. 608,141
Int. Cl. B65 83/00; G04c 23/46; G01f 11/46
U.S. Cl. 222—70                             4 Claims

ABSTRACT OF THE DISCLOSURE

Dispenser apparatus including a trap chamber defined between arcuate upper, tined gates and pivoted lower gates sequentially operated by solenoid actuated operating means, for dispensing measured quantities of precut potatoes.

---

The present invention relates to dispenser apparatus and more particularly to dispenser apparatus for use in dispensing precut potatoes and the like material in measured quantities from a bulk source.

It has become the practice in the preparation of French fried potates in restaurants to obtain precut potatoes in bulk, for example, in rectangular boxes containing twenty pounds of potatoes. The handling of such bulk potatoes by a cook has posed a problem, and it has been the general practice to dump the twenty pound containers of potatoes into a drawer or other receptacle handy to the cook and from which he periodically will fill a basket adapted to be immersed in the deep cooking fat.

The present invention has as a principal object the provision of dispenser apparatus which substantially facilitates the handling by a cook of bulk precut raw potatoes intended to be French fried, but it will be understood that the invention may be employed for other similar purposes.

In accomplishing the foregoing, it is a more specific object of the invention to provide in a dispenser apparatus a receiver for bulk quantities of precut raw potatoes or other like material, whereby the bulk potatoes may be discharged from a shipping receptacle into such receiver or the receiver is so conformed as to receive an open end of the shipping receptacle so that the latter will effectively discharge its contents into the receiver progressively as the precut potatoes are dispensed. In addition, in the apparatus means are provided for supporting the bulk precut potatoes including tined upper gates adapted to be moved toward mutually cooperative potato supporting positions from retracted positions at which the bulk potatoes are free to pass downwardly therethrough, together with lower gate means which, when the upper tined gates are open, will arrest downward movement of the bulk potatoes until the tined upper gates are again closed, whereby a quantity of potatoes substantially filling the volume of the space between the upper and lower gates will be trapped between the upper and lower gates, and thereafter the lower gates will be opened to dispense the measured quantity of potatoes therefrom into a suitable receptacle, such as the deep frying basket conventionally employed by cooks in the preparation of French fried potatoes and like materials.

Another object of the invention is to provide apparatus as aforesaid in which the volume of potatoes to be dispensed may be adjusted by adjusting the spaced relation between the upper and lower gates.

Still another object is to provide dispensing apparatus including upper and lower shiftable gate means as described above having sequentially operable actuator means for effecting the above mentioned sequence of opening and closing of the upper and lower gates, such operating means including motor means for the respective gates in the specific form of reciprocable solenoid mechanisms in a control circuit, whereby upon energization of the circuit the apparatus will complete one cycle of operation, i.e., opening of the upper gates to allow the bulk potatoes or the like to descend into engagement with the lower gates, closure of the upper gates to support the superjacent bulk potatoes, opening of the lower gates to dispense the potatoes, and closure of the lower gates, in preparation for a subsequent energization of the circuit which will cause a repetition of the cycle.

Other objects and advantages of the invention will be hereinafter described or will become apparent to those skilled in the art, and the novel features of the invention will be defined in the appended claims.

In the accompanying drawings:

FIG. 1 is a view in side elevation showing a dispenser apparatus made in accordance with the invention and with the upper gates in open position, and also showing in broken lines a cooking basket disposed beneath the apparatus for reception of the dispensed potatoes;

FIG. 2 is a vertical sectional view as taken on the line 2—2 of FIG. 1 and exposing within an end housing the operating mechanism for effecting opening and closing of the respective upper and lower gates;

FIG. 3 is a view in vertical section as taken on the line 3—3 of FIG. 1, and more particularly illustrating the upper gates in open position with the bulk potatoes supported on the lower gates;

FIG. 4 is a view corresponding to FIG. 3, but showing the upper gates closed to support the superjacent bulk potatoes and the lower gates opened;

FIG. 5 is a fragmentary detail view in horizontal section as taken on the line 5—5 of FIG. 4; and FIG. 6 is a diagrammatic view illustrating the control circuitry for the motor means whereby the upper and lower gates are opened and closed.

Like reference characters in the several views of the drawings and in the following description designate corresponding parts.

The illustrative embodiment of the present dispenser apparatus comprises a facility for receiving bulk quantities of precut, raw potatoes or like material from a shipping receptacle, such facility comprising a vertically extended rectangular receiver 1 having opposed long side walls 2, 2 and opposed connecting short side walls 3, 3, the receiver being adapted to be supported in a convenient location as by means of downwardly extended legs 4 so as to support the receiver above a work surface in such a manner as to accommodate between the lower end of the receiver and the work surface the usual deep fat frying basket designated 5 into which measured quantities of the potatoes are to be dispensed as needed.

At its upper end, the receiver 1 has a flared mouth 6 to facilitate filling the receiver with the bulk potatoes on the one hand, or to facilitate insertion of an open end of a box containing such potatoes into the open upper end of the receiver so that the box effectively forms a closure for the upper end of the receiver.

Upper gate means are provided which, as seen in FIG. 4, are adapted when closed to support the bulk potatoes thereabove. This upper gate means comprises a pair of similar tined gate assemblies generally denoted at 7, and each comprising a horizontally extended support member 8 disposed externally of the adjacent side walls 2 and connected at its respective opposite ends to a stabilizing link 9 and an actuating link 10. These links are pivotally mounted on pivots respectively designated 11 and 12 and mounted at the exterior of the opposed side walls 3 of the receiver. Thus, the upper gates 7 are mounted for pivotal movement in opposite directions about a common axis.

Mounted on the support members 8 and extending toward one another are gate elements 13 in the form of arcuate pointed tines, the tines on one support member 8 being slightly laterally offset from the tines on the other support member, as best seen in FIG. 5, so that in the closed positions the gate tines slightly lap at their free ends. The tines 13 extend through openings 14 in the side walls 2 of the receiver and in reinforcing plates 15 suitably affixed externally of the walls 2 and extended thereacross.

Lower gate means are provided including a pair of gates 16 each in the form of a longitudinally extended plate, which is suitably affixed as by crimping at 17 to a supporting shaft 18. The shafts 18 extend through vertically extended slots 19 in the end walls 3 of the receiver so as to be vertically shiftable therein, and the shafts are supported in vertically adjustable end plates 20 externally of the receiver end walls. As best seen in FIGS. 2 and 5, the shaft supporting plates 20 are vertically shiftably disposed in opposing channels 21 suitably affixed to the side walls 3 as by fasteners 22, and the channels 21 are equipped with means, such as screws 23 (FIG. 2), which are engageable with the plates 20, to maintain the same in selected vertical positions within the range of the vertical slots 19. Thus, it is apparent that the lower gates 16 are adjustable relative to the upper gates so that the intervening space constituting a trap chamber for receiving a measured quantity of potatoes may be appropriately adjusted whereby, in a manner hereinafter to be described, the desired measured quantity of potatoes may be dispensed through the lower gates 16 into the basket 5.

Actuator means for the upper gate means and more particularly for effecting corresponding pivotal movement of the actuator links 10 are provided on one of the side walls 3, as best seen in FIG. 2. Such actuator means includes a support member 24 mounted on the wall 3 above link pivot 12 and pivotally supporting thereon a pair of levers 25. To one end of each lever 25 is connected a link 26, while at the other end of each lever there is connected a link 27. Links 26 interconnect levers 25 with gate supporting links 10, while links 27 interconnect the levers 25 with an armature 28 of a solenoid 29. This solenoid is suitably secured to a mounting plate 30 disposed on the end wall 3 and at the upper end of the plate 30 are adjustable stop screws 31 constituting means for limiting opening movement of the upper gates upon engagement of the gate supporting links 10 therewith.

As shown in broken lines in FIGS. 3 and 4, the stabilizing links 9 at the opposite side 3 of the receiver 1 from the actuator links 10 are connected to companion actuator links 26a corresponding to the links 26 just described above. These links 26a are connected at their upper ends to levers 25a. Levers 25 and 25a are fixed on rockable shafts 26b which extend crosswise of the side walls 2 and by which the levers 25 and 25a are simultaneously actuated by the solenoid armature 28.

From the foregoing, it will be apparent that reciprocation of the solenoid armature 28 will effect oscillation of the actuator links 25 resulting in pivotal movement of the gate supporting links 9 and 10 so as to move the tined gates between the open positions shown in FIGS. 1, 2, and 3, and the closed positions shown in FIGS. 4 and 5.

Actuator means for effecting opening and closing pivotal movement of the lower gates 16 are provided and in the illustrative embodiment such actuator means, as best seen in FIG. 2, includes sprockets 32 fixed on the adjacent ends of the bottom gate supporting shafts 18 and sprockets 33 mounted on the end plate 20, the respective sprockets being engaged by drive chains 34. The chains 34 are connected at one end to the respective sprockets 32 and at the other end to a cross head 35 carried by a reciprocable armature 36 of a solenoid assembly 37 which is mounted on the end plate 20 and constitutes motor means for operating actuator means just described to move the lower gates between their opened and closed positions. Also attached to each sprocket 32 is a lever 38, the levers projecting from the sprockets and having the free ends thereof interconnected by a tension spring 39 tending to normally rotate the gate supporting shafts 18 in opposite directions so as to normally close the gates 16.

Means are provided for controlling the actuation of the upper and lower gate means so that the upper gate tines 13 are normally, as shown in FIGS. 4 and 5, projected into the receiver so as to support the precut potatoes thereabove. When it is desired to allow the downward movement of the bulk precut potatoes into engagement with the lower gates 16 which are normally closed by spring 39 or the like, the solenoid 29 will be energized to cause retraction of the armature 28, that is, downward movement of the armature, as seen in FIG. 2, so as to rock inner ends of the levers 25 downwardly and the outer ends of levers 25 upwardly, thereby through links 26 causing upward pivotal movement of gate links 10. This movement will cause the tines 13 to be retracted from the receiver in arcuate paths, and the bulk, precut potatoes will fall to rest on the gates 16, as shown in FIG. 3. Then, upon energization of solenooid 29 to reverse the action of armature 28, gate links 9 and 10 will be pivoted downwardly, to the position shown in FIGS. 4 and 5, the arcuate form of the tines facilitating their piercing through the bulk potatoes, and the superjacent potatoes then again being supported by the upper gates 7. Thereafter, solenoid assembly 37 will be energized to retract the armature 36 or move the same downwardly, as shown in FIG. 2, thereby pulling downwardly on the cross head connected ends of chain 34, rocking shafts 18 in directions whereby the lower gates 16 will be opened, as shown in FIG. 4, so that the precut potatoes therein are dispensed into the subjacent basket 5. Thereafter, the solenoid armature 36 will again be caused to project to the position shown in FIG. 2 so that the lower gates will be closed by spring 39.

Preferably, such means for effecting the sequential operation of the motor means or solenoid assemblies and related actuator mechanisms as just described, may comprise the control circuit diagrammatically illustrated in FIG. 6. Included in the circuit is a timer switch mechanism T adapted to be energized for one cycle upon closing of a normally open switch S in an electrical conductor lead 40 leading from a source to the timer motor M. A conductor 41 energizes the time T following closure of switch S. The timer is of the type which will remain energized through a switch 41A for one cycle during which the circuit from the conductor 41 leading to the timer switch posts will be first completed to a conductor 42 through switch 42A and leading to solenoid 29 whereby to retract its armature, as described above, in the first stage of operation of the apparatus. Thereafter, conductor 41 will be connected through the timer switch 43A to a conductor 43 leading to the other side of solenoid 29 so as to cause retraction of the armature 28 whereby, as described above, the timed gates 7 will be closed. Thereafter, the timer will connect conductor 41 through a switch 44A to a conductor 44 leading to solenoid 37 to retract armature 36 whereby lower gates 16 will be opened against the normal closing force applied thereto by the spring 39. Then, upon deenergization of solenoid 37, the gates 16 will resume the normally closed position and a timer cycle will be complete.

Included in the circuit of FIG. 6 is a common ground conductor 45 which completes the circuit between the conductor 40, the timer, and the solenoids 29 and 37. Also included in the circuit of FIG. 6 is preferably a lamp L connected in parallel with motor M adapted to give a visual indication that the apparatus is in operation. in response to depression of the switch S, the lamp remaining illuminated until the timer has completed its cycle.

Preferably, the components of the dispensing apparatus which will contact the precut potatoes will be composed of such materials as staainless steel or plastic and for purposes of sanitation as well as appearance, the operating mechanisms including all of the gate supporting links 9 and 10 and the actuator and stabilizing links therefor as well as the actuator mechanisms for the lower gate supporting shafts 18 will be enclosed in suitable housings 46 and 47 of two parts which in the illustrative embodiments are winged housing members medially joined and adapted to be suitably affixed at the sides 3 of the receiver so as to cover the operating mechanisms. However, the gates 7 and more particularly the tine supports 8 thereof extend exteriorly of the side walls 2 of the receiver so that, as best seen in FIG. 2, the housing 46 is provided with slots 6a through which the tine supports 8 extend and, similarly, the housing 47 at the other side of the receiver is provided with slots 47a.

While the specific details of an illustrative embodiment of the dispenser apparatus and a specific operating means and control circuit therefor have been herein shown and described, it should be understood that changes and alterations may be resorted to without departing from the spirit of the invention as defined in the appended claims.

I claim:

1. Dispenser apparatus for precut potatoes and the like material, comprising: a vertical receiver adapted to receive therein a bulk quantity of material; upper gate means including elements extended through said side walls into mutual cooperative relation for supporting said material; a solenoid selectively energizable for operating said upper gate means to opened and closed positions; lower gate means spaced beneath said upper gate means a distance representing the volume of said material to be dispensed, said lower gate means including a pair of cooperative gates; mans pivotally supporting said pair of gates adjacent the side walls of said receiver; spring means normally operative to close said pair of gates; a solenoid energizable to open said pair of gates; and control means including a motor, a timer, said motor adapted to actuate said timer and said timer including switches operable for cyclically energizing said solenoids.

2. Dispenser apparatus for precut potatoes and the like material, comprising: a vertical receiver having enclosing side walls for receiving a bulk quantity of the material to be dispensed; upper gate means including a pair of swingable link structures extending to the opposite sides of said receiver from a common pivotal support; laterally spaced arcuate tines carried by said link structures having their free ends extending into said receiver to occupy gate closed and gate open positions in response to movements of said link structures towards and away from each other; a solenoid actuator connected to said link structures, selectively energizable to move said link structures towards and away from each other; lower gate means including a pair of plate members supported on laterally spaced rotatable shafts for swinging said plate members to a gate closed position extending across the receiver below the upper gate and a gate open position at opposite sides of the receiver; means for actuating said lower gate including a spring having its ends connected with said shafts and normally acting to swing said plates to gate closed position; a solenoid actuator connected with said shafts energizable to oppose the action of said spring and swing said plates to gate open position; and control means for cyclically energizing said solenoids.

3. Dispenser apparatus according to claim 2, wherein said shafts respectively have a drive sprocket and projecting lever, said spring having its end connected between the lever arms of said shafts, and the solenoid actuator for the lower gate is connected with link chains respectively carried around said drive sprockets and anchored at their adjacent ends thereto.

4. Dispenser apparatus as defined in claim 2, wherein means are provided mounting said shafts and said actuating means therefor for vertical adjustment to vary the space between said upper gate means and said lower gate means.

References Cited

UNITED STATES PATENTS

| 981,707 | 1/1911 | Spencer | 222—438 XR |
|---|---|---|---|
| 1,267,635 | 5/1918 | Cox | 222—438 XR |
| 1,810,772 | 6/1931 | Lassen | 222—438 XR |
| 2,611,465 | 9/1952 | Simon | 222—450 XR |
| 2,636,648 | 4/1953 | Richardson | 222—503 |
| 2,721,678 | 10/1955 | Gill | 222—445 |
| 3,227,313 | 1/1966 | Morena | 222—436 XR |

FOREIGN PATENTS

| 882,305 | 2/1943 | France. |
| 422,124 | 1/1935 | Great Britain. |

WALTER SOBIN, Primary Examiner.

U.S. Cl. X.R.

222—436, 438, 450

PO-1050
(5/69)

UNITED STATES PATENT OFFICE
CERTIFICATE OF CORRECTION

Patent No. 3,442,423          Dated May 6, 1969

Inventor(s) Lester W. Cozad

It is certified that error appears in the above-identified patent and that said Letters Patent are hereby corrected as shown below:

Column 5, line 16, "6a" should read --46a--; line 37, "mans" should read --means--.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents